United States Patent Office 3,047,538
Patented July 31, 1962

3,047,538
PREPARATION OF UREA-FORMALDEHYDE
FOAMED RESIN
Henry W. Steinmann, Broomall, Pa., assignor to Scott Paper Company, Chester, Pa., a corporation of Pennsylvania
No Drawing. Filed June 16, 1958, Ser. No. 742,002
3 Claims. (Cl. 260—70)

The present invention relates to the preparation of urea-formaldehyde foamed resins of special applicability as a component of paper, paperboard and paper stocks.

The current trend to specialized papers embodying varying amounts of synthetic resins has heightened the interest of research workers in the development of fibrous substances which are readily compatible with cellulosic materials and capable of physical bonding therewith or which are susceptible of combination with cellulosic fibers through the use of separate bonding agents. Because paper, as it is generally known today, is composed of uni-axial or uni-dimensional filaments, wherein the ratio of length to diameter or width has an order of magnitude of from 10 to 1 to 100 to 1, with the fiber axes lying predominantly in the plane of the sheet, the synthetic materials incorporated in paper stocks have almost entirely been in the form of spun filaments approximating the configuration of natural cellulosic fibers. Where it has been desired to modify the physical aspects of the paper, slurries of greater density will enable the production of a thicker sheet, and with less compression during drying a bulkier, more porous product is enabled. Creping of the sheet as it is removed from the machine or an embossing, scoring or perforating step during finishing operations will also serve to disrupt the normal uniplanar sheet formation.

It is an object of my invention to provide a urea-formaldehyde foamed resin which is blendable with uni-axial filamentary material for the preparation of sheeted, paperlike products.

Another object of the present invention is the provision of an improved urea-formaldehyde foamed resin that will impart softness and high bulk to sheeted, paper-like products in which it is embodied.

A further object of the present invention is to provide a urea-formaldehyde foamed resin which is disintegratable into multi-axial fiber assemblies and rod-like structures which are readily compatible with uni-axial cellulosic fibers.

Other objects and advantages of my invention will be apparent from the following detailed description of certain preferred embodiments thereof.

Briefly stated, the present invention contemplates the controlled condensation forming of a urea-thiourea-formaldehyde prepolymer at a pH of from 5–7 with pyridine, the foaming of such prepolymer, and disintegration of the ultimate foam, after curing thereof, into multi-axial fiber assemblies which are particularly adapted for inclusion in paper stocks.

It is known that certain synthetic resins may be converted into semi-rigid foams with structures of definite geometry. A urea-formaldehyde prepolymer, for example, formed by condensing urea and formaldehyde in an approximate 1 to 2 molar ratio may be foamed by the whipping of an aqueous solution containing an acid catalytic hardening agent which causes the foam to set as a frangible, cellular mass. Upon drying, the foam disintegrates to a considerable degree. A more resilient and tough although heavier foam may be prepared by the inclusion of fibrous fillers in the resin prepolymer and a reduction of the amount of foaming to which the solution is subjected. In another method, a foam of satisfactory light weight and resiliency has resulted from the addition of an aqueous solution of the urea-formaldehyde prepolymer to a cellulated mass or froth composed of surfactant, water and acid catalyst. Further condensation of the dispersed prepolymer under the influence of the acid catalyst occurred in the cell walls of the froth and the mass congealed or hardened in situ. Regulation of the density of the cellulated matrix by aeration thereof enables control of the density of the resin foam within limits of from 0.2 to 0.8 pound per cubic foot. Upon curing and drying, there will be observed some regulable collapse or reticulation of the cell structure leaving a skeletal configuration composed of rod-like strands and assemblies, which under agitation may be disintegrated into segments and cell residues of various degrees of complexity and finally into branched or multi-axial fiber nodes comprising broken residual junctions of the original foam structure.

Disintegration of the resin foam may be effected in conventional hydropulpers, beaters, Jordan mills, fiberizing disc mills and the like, equipment usually employed in the preparation of wood fiber pulps. The degree of disintegration, deagglomeration or foam fracture will depend upon the nature of the apparatus utilized and the time of exposure. Manifestly, vigorous agitation under increasing increments of pressure will result in more disintegration than would be possible when operating at low pressures for short periods of time. It is, of course, possible to effect the total deagglomeration of the resin foam particles with the beating of the wood pulp and the blending of the cellulosic and resin fibers preliminary to sheet formation from the resultant stock or furnish. The type as well as the amount of uni-axial fibers with which the disintegrated resin foam is combined may be varied within wide limits as desired and will, of course, determine the nature of the ultimate paper which is formed. Cellulosic fibers from soft and hard woods, bagasse, bamboo or cotton are suitable source materials and the treatment thereof may include sulfite, sulfate, semi-chemical as well as chemi-mechanical pulping. Where a wood base is employed, ground-wood pulps are quite appropriate. Although mineral fibers can replace a portion of the cellulosic fibers in the base pulp, it is preferred that these be in the minority in order to obviate the need for special bonding additives in the ultimate sheet formation. Similarly, the presence of a small percentage of uni-axial filaments of a spun synthetic resin is also contemplated. It is preferred that the uni-axial fibers constitute the major portion of the composite paper stock, although as much as 50% by weight of such stock may consist of the disintegrated resin foam.

One observed disadvantage of the usual disintegrated resin foam is the presence therein of minute granules or grit-like particles which are carried in the paper stock suspension embodying such foam and which result in noticeable defects in the ultimate paper formed from the stock. The more frangible the foam, the more particulate rather than fibrous the disintegrated foam. It is not believed that the density of the foam has any bearing upon the amount of particulosity in the disintegrated product. It has been ascertained, however, that a careful control over the conditions under which the resin prepolymer is prepared will enable the formation of a more tough, resilient foam therefrom and a reduction in the number of granules present in the disintegrated foam.

In the practice of the present invention, preparation of the urea-formaldehyde prepolymer is effected by condensing the reaction mixture at a pH of from 5 to 7 using a pyridine control and removing from the mixture an amount of water equivalent to from 28 to 33 percent by weight thereof. The resultant prepolymer solution, containing from 55 to 75 percent by weight of solids, is readily converted into a foam possessing the cellular configuration adapted for conversion into papermaking stock.

The proportions of urea and formaldehyde employed in forming the prepolymer may be varied, but a molar ratio of about 1 to 2 is preferred. It is also preferred to include a small amount of thiourea, representing approximately 5 mol percent of the combined urea and thiourea, in the initial reaction mixture.

*Example I*

A weight of 324 grams of commercial formalin solution (37% formaldehyde) was treated with 20 grams of pyridine in a 1-liter, 3-necked flash equipped with mechanical stirrer and condenser turned down for distillation. A mixture of one hundred fourteen grams of urea and 7.6 grams of thiourea was introduced into the flask and heating of the resultant solution initiated. There was removed from the flask by distillation over a period of about 2 hours a volume of 150 ml. of distillate consisting essentially of water admixed with some pyridine. During the reaction period, the pH of the solution was maintained between 5 and 7. The residual solution, on cooling to room temperature, was slightly cloudy, of medium viscosity and contained 69.4 percent by weight of resin solids. Where only 140 ml. of distillate is removed, the residual solution contained 61.7 percent by weight of resin solids.

*Example II*

A resin solution was produced by the procedure of Example I except that no thiourea is employed in the reaction mixture, an additional 6 grams of ureau being substituted therefor. There was removed from the mixture 150 ml. of distillate and the residual solution contained 63.6 percent by weight of resin solids.

*Example III*

A resin solution was produced by the procedure of Example I except that there was removed from the mixture 165 ml. of distillate. The residual solution was slightly more viscous than that of Example I although it contained only 63.6 percent by weight of resin solids.

*Example IV*

A resin solution was produced by the procedure of Example I except that there was removed from the mixture 170 ml. of distillate. The residual solution gelled upon cooling.

*Example V*

A resin solution was produced as in Example II except that there was removed from the mixture 210 ml. of distillate. The residual solution contained 72.8 percent by weight of resin solids.

In the production of foams, a cellular mass or froth of Neomerpin-N (an alkylated naphthalene sulfonic acid surface acting agent), water and phosphoric acid produced by whipping and mechanical aeration provides the reaction zone wherein aqueous solutions of the resin prepolymer undergo further condensation while they are distributed throughout the body of the froth in the cell walls thereof. An adequate froth is obtained by whipping a mixture of 3 ml. of the surface active agent in 50 ml. of water containing 1.5 ml. of 85% phosphoric acid. A 50 gram portion of resin solution as formed in Example I when added to the above type of froth resulted in a soft, tough, resilient foam having a reticulated structure and the product upon disintegration yielded multi-axial fiber assemblies which were suitable for inclusion in paper stocks. The resin solutions of Examples II and V also produced foams but upon drying these were harder and more frangible than the earlier foams and upon disintegration the fibrous assemblies were admixed with considerable quantities of grit-like particles. The resin solution of Example III produced a foam which set so rapidly that the homogeneity essential to proper disintegration and formation of papermaking stock was lacking.

In order to evaluate the resin foams as source material for papermaking stocks, each sample was disintegrated or deagglomerated, after partial comminution by hand, in admixture with a sulfite wood pulp suspension of mixed western hemlock and white fir having a consistency of about 1.4% and a freeness of about 400, the mixture being diluted with water to approximately doubled volume, in a British Standard disintegrator for 10 minutes. British hand sheets were prepared using 500 ml. of suspension for each sheet. The sheets were dried overnight at 75° F. and 55% relative humidity and were then tested according to standard TAPPI methods.

The results are as follows:

|  | Percent U-F Foam in Sheet | Dry Basis Weight | Specific Volume | Breaking Length | Tear Factor | Brightness | Percent Incr. in Specific Volume for Each Percent of Foamed Resin in Sheet |
|---|---|---|---|---|---|---|---|
| Resin of Ex. I | 0 | 157 | 1.32 | 6,406 | 142 | 73.7 | |
|  | 10 | 155 | 1.82 | 5,627 | 146 | 75.7 | 3.79 |
|  | 20 | 154 | 2.40 | 4,568 | 141 | 81.7 | 4.09 |
|  | 30 | 149 | 2.95 | 3,576 | 129 | 83.2 | 4.12 |
| Average | | | | | | | 4.00 |
| Resins of Ex. II and V | 0 10 20 30 | All sheets had rough surfaces, were hard and gritty. Resin components obviously deleterious and other tests not made. | | | | | |
| Resins of Ex. III | | Foams not uniform. | | | | | |
| Resin of Ex. IV | | Gelled—not foamable. | | | | | |

The foregoing results indicate that the inclusion of resin foams produced in accordance with Example I in paper stock will improve materially the bulk of the sheeted paper derived therefrom and the paper will have increased brightness, properties which are of particular value to most papers. Immeasurable physical properties ascertainable only upon inspection present in papers modified by the embodying therein of resin foams are increased softness, enhanced surface attractiveness and feel. Similarly resin foam inclusions increase paper opacity in direct proportion to the resin content thereof.

It will be obvious from the foregoing data that the composition and method of preparation of the resin prepolymer are of extreme importance to the production of foams which will possess the softness, freedom of grit and disintegratability essential to a satisfactory source of papermaking stock. A decrease in the formaldehyde-urea ratio in the resin prepolymer below the prefererd 2 to 1 ratio will generally increase the rate of curing, although there is an accompanying decrease in the tolerance of the resin solution for water resulting in precipitation of the prepolymer from solution before a stable foam has been effected. An increase in the formaldehyde-urea ratio in the resin prepolymer decreases the rate of curing and results generally in unstable foams of undesirably high density.

The improved resin prepolymers of my invention enable the production of light-weight foams which are readily convertible into multi-axial fiber assemblies adapted for admixture with uni-axial cellulosic filaments in the formation of paper products possessing high bulk, softness and opacity.

What I claim is:

1. A process of preparing a urea-thiourea-formaldehyde prepolymer particularly adapted for foaming and subsequent conversion into a papermaking material which comprises condensing at a pH of from 5–7 an admixture of thiourea and urea, the thiourea representing approximately 5 mol percent of such admixture, with formaldehyde in the presence of pyridine in an amount constituting about 10 percent by weight of the condensing mixture, the mixedureas and the formaldehyde being in a molar ratio of approximately 1 to 2, and removing sufficient distillate from the condensing mixture to provide a residual solution containing from 55 to 75 percent by weight of solids.

2. A process of preparing a urea-thiourea-formaldehyde prepolymer particularly adapted for conversion into a foam structure from which upon disintegration a papermaking material is derivable, which process comprises condensing at a pH of from 5–7 an admixture of thiourea and urea, the thiourea representing approximately 5 mol percent of such admixture, with formaldehyde in the presence of pyridine in an amount constituting about 10 percent by weight of the condensing mixture, the mixed ureas and the formaldehyde being a molar ratio of approximately 1 to 2, removing from the condensing mixture an amount of distillate equivalent to from 28 to 33 percent by weight of such condensing mixture, and recovering an aqueous solution of resin prepolymer.

3. A process of preparing a urea-thiourea-formaldehyde prepolymer particularly adapted for conversion into a foam structure from which upon disintegration a papermaking material is derivable, which process comprises condensing at a pH of from 5–7 an admixture of thiourea and urea, the thiourea representing approximately 5 mol percent of such admixture, with formaldehyde in the presence of pyridine in an amount constituting about 10 percent by weight of the condensing mixture, the mixed ureas and the formaldehyde being in a molar ratio of approximately 1 to 2, removing from the condensing mixture an amount of distillate equivalent to from 28 to 33 percent by weight of such condensing mixture, and recovering an aqueous solution of resin prepolymer containing from 55 to 75 percent by weight of solids.

References Cited in the file of this patent

UNITED STATES PATENTS

| | | |
|---|---|---|
| 2,029,893 | Ripper | Feb. 4, 1936 |
| 2,121,077 | Ellis | June 21, 1938 |
| 2,559,891 | Meyer | July 10, 1951 |